Patented Feb. 17, 1925.

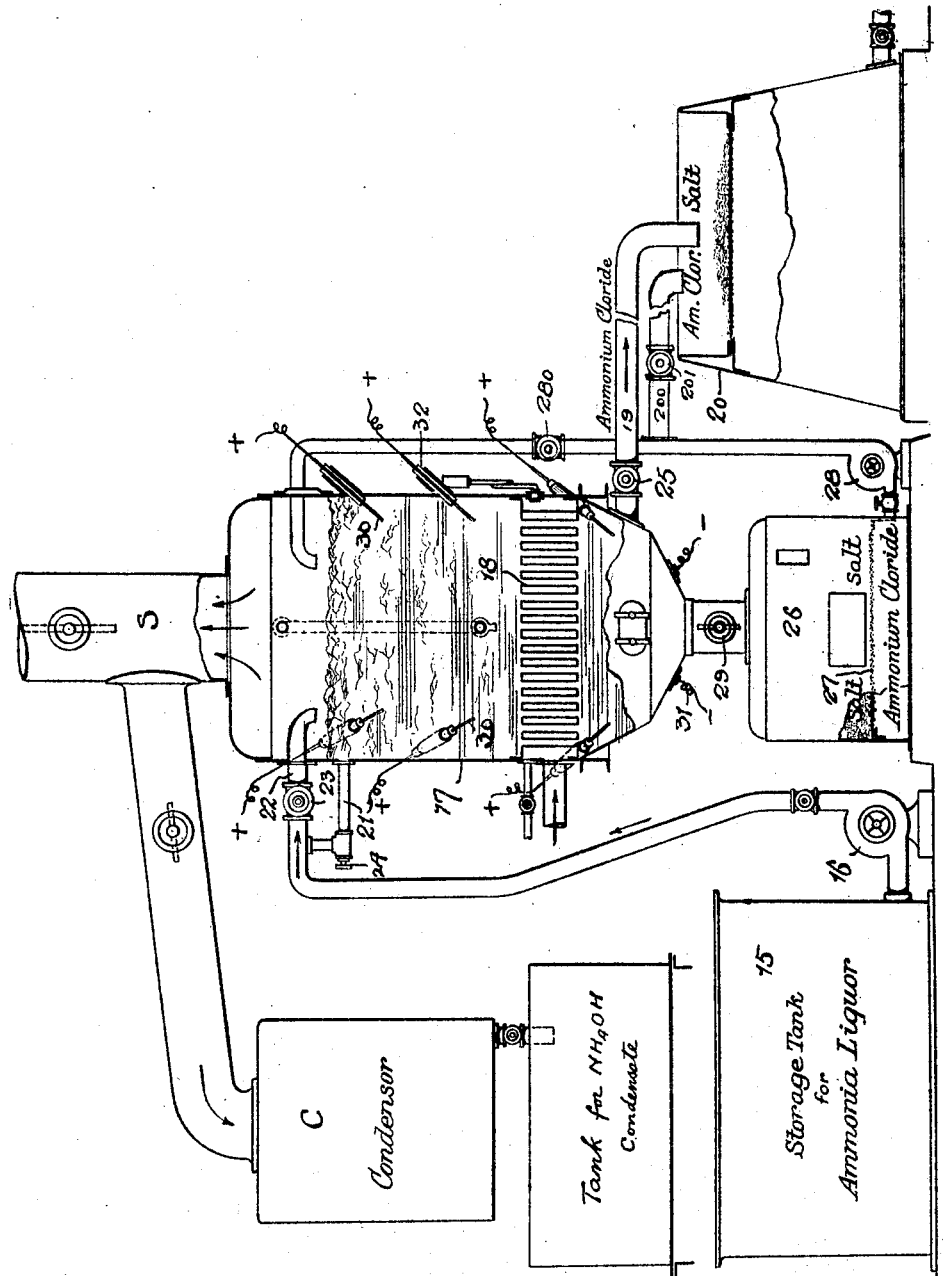

1,527,027

UNITED STATES PATENT OFFICE.

WILLIAM H. DAHMEN, OF YARDLEY, PENNSYLVANIA.

RECOVERY OF AMMONIUM CHLORIDE.

Application filed May 10, 1924. Serial No. 712,309.

*To all whom it may concern:*

Be it known that I, WILLIAM H. DAHMEN, a citizen of the United States of America, residing at Yardley, in the county of Bucks and State of Pennsylvania, have invented certain new and useful Improvements in the Recovery of Ammonium Chloride, of which the following is a specification.

My invention relates to the recovery of ammonium chloride from liquors containing ammonia, and the object of my invention is to provide a process and apparatus by which such recovery may be accomplished economically and effectively on a commercial scale from the waste ammonia liquor produced as an incident to the manufacture of soda (Solvay process) or from the ammoniacal liquors resulting in the manufacture of coke or gas from coal, or from other appropriate liquors containing ammonia, or ammonium compounds.

Such waste ammonia liquor may contain from 10 to 15% of ammonium chloride; about 3% of ammonium bicarbonate (or a corresponding amount of free ammonia $NH_3$); about 7% of sodium chloride; and small quantities of sodium sulphate, sodium sulphide, sodium thiosulphate and hydrogen sulphide. The liquor from coke or gas producers also contains small quantities of various impurities such as tar, which for the purpose of this invention may be neglected.

The treatment of such liquor according to my process, proceeds preferably as follows—

The liquor is first slowly heated (to about 75° C.) for the purpose of driving off the free ammonia. If the liquor contains the latter in the combination ammonium bicarbonate, the latter is decomposed and driven off.

$$(NH_4HCO_3 = NH_3 + H_2O + CO_2)$$

The gases from the liquor during this preliminary treatment are preferably led to a condenser, where the free ammonia ($NH_3$) and water ($H_2O$) combine to form $NH_4OH$.

The treatment is continued until the liquor is neutral or substantially so. This can be readily determined by test. If 20 c. c. be drawn from the evaporator, and an indicator added (methyl orange), a small quantity of double normal HCl (not more than 0.3 c. c.) will turn the color red if the liquor is sufficiently alkaline for further treatment in accordance with my process.

When the liquor has been thus neutralized, its temperature is raised gradually to a point not over 113° C., until saturated as to NaCl content. Sodium chloride crystallizes from the hot liquor and the crystals may be separated if desired.

The liquor is then chilled. Ammonium chloride crystallizes and is filtered out of the liquor—while the latter, if it still contains an appreciable quantity of ammonium chloride, is returned to the evaporator with a succeeding charge.

The ammonium chloride crystals secured are 97% to 98% pure. There may be present, some traces of sodium chloride and ferrous chloride.

In some instances the percentage of sodium chloride present in the liquor is too slight to make its separate recovery necessary. In this case the temperature of the liquor after neutralization may be raised rapidly to 113° C., in order to effect its more rapid evaporation. The concentrated liquor is led to the cooling tank in which the sodium chloride precipitates, as an unobjectionable impurity, with the ammonium chloride. When the latter is used as a fertilizer or fertilizer ingredient, the presence of a small quantity of salt (say up to 10% or so) is not objectionable.

During either of these processes it is necessary to prevent action of the solution upon the iron walls of the evaporator, and for this purpose I pass an electric current through the liquor, the evaporating vessel itself being used as the cathode, and iron rods can be used as the anodes. In this manner it has been found that action of the solution on the evaporating pan is entirely prevented.

The facility and economy of the process are such that the ammonium chloride may be obtained at a price low enough to render it marketable as a fertilizer or fertilizer ingredient. Its value for this purpose, by reason of its available nitrogen, will be recognized.

In the accompanying drawing, I have indicated partly in vertical section and partly in elevation, diagrammatically, apparatus in which the process may be carried out, although for continuous operation a partial duplication of the layout is necessary.

As here shown the ammonia liquor is drawn from storage tank 15 by pump 16, which delivers to the upper portion of the evaporator 17. Toward the bottom of the latter is arranged a heating device which may comprise a group of steam boiler tubes 18, below which is the outlet 19 for the hot liquor to the cooling and crystallizing tank 20.

A by-pass 21 around the main inlet 22 to the evaporator is provided for use on a continuous operation of the process as hereinafter mentioned. Associated valves 23 and 24 in the main inlet and by-pass respectively are also provided, while a valve 29 controls the outlet.

Below the evaporator is a salt tank 26 with filter screen 27, below which a connection is made for the pump 28 by which the liquor is returned to the upper portion of the evaporator. A valve 280 in the return line is provided and also a branch line 200, with valve 201, leading to the chilling tank 20.

From the uptake S which leads from the top of the evaporator, a branch leads to the condenser C for the condensation and recovery of ammonium hydroxide when this is desired.

The operation may be intermittent or continuous. When intermittent, the neutralization of the liquor is effected in the evaporator 17 at relatively low temperature (75° C.); followed by slowly raising the temperature to boiling, and continuing the boiling until the temperature goes up to not over 113° C. After the free ammonia has been driven off, the valve between S and C can be closed and the valve in S can be opened. This, of course, will be some time before the temperature of the boiling liquor reaches 113° C. The evaporation is preferably continued until the liquor is substantially saturated at 110.5 to 113° C., with $NH_4Cl$, during which period, NaCl if present in any substantial amount, will separate out, in substantial quantity. The boiling should not be continued until the temperature exceeds 113° C., else a considerable amount of $NH_4Cl$ will separate out with the NaCl.

When sufficiently evaporated for the bulk of the sodium chloride to begin to crystallize, the valve 29 is opened and the liquor is circulated by pump 28 (valve 280 being open and valve 201 closed) until the common salt crystals have been separated out by the screen 27, the boiling of the liquor being continued. The valve 280 may then be closed and valve 201 opened (the boiling being then stopped) so that the pump 28 now delivers to the chilling tank 20, where the ammonium chloride crystallizes out and is recovered.

If separate separation and recovery of the sodium chloride is not desired, neutralization and evaporation are effected in the evaporator 17, as above described, and the liquor at once delivered to the chilling tank 20 through outlet 19, the valve 25 of which is opened.

If a continuous process is desired, a second evaporator such as 17 is provided, in which neutralization is effected at low temperature. The neutralized and partially evaporated liquor is delivered to tank 15 and thence to evaporator 17 through the readily controlled by-pass 21. It will then not be necessary to have a condenser on the second evaporator 17. The temperature in evaporator 17 is kept higher than that in the neutralizing evaporator (but always below 113° C., if sodium chloride is to be separately recovered). The liquor from evaporator 17 is continuously passed to the chilling tank 20, either directly through outlet 19 if sodium chloride is not to be separately recovered, or through tank 26 if the sodium chloride is to be separated from the liquor independently of the ammonium chloride.

Whatever the procedure, the protection of the evaporator 17, if of iron, is necessary since the hot ammonium chloride liquor is very destructive to the iron wall of the evaporator. To this end, current is passed through the liquor from immersed anodes 30 to the iron walls of the evaporator 17 (cathode), the connection at 31 leading to the negative pole of a suitable source of direct current. The anodes employed are preferably of iron, zinc, or other substance which will prevent the formation of nitrogen chloride ($NCl_3$) which is of very explosive character. Thus, anodes of platinum or carbon, will not serve.

The anodes are preferably of iron and are fed forward through insulating bushings 32 as rapidly as consumed, in order to keep the anodes in constant contact with the liquor. The decomposed anode material finds its way into the recovered ammonium chloride as ferrous chloride ($FeCl_2$). A portion of it is also deposited on the wall of the evaporator in the form of a fine film of metallic incrustation, which is readily removed with boiling water.

The size, shape and mounting of the anodes may be varied. I have found it convenient to employ a plurality of iron rods, approximately 1 cm. in diameter arranged at various points around the periphery of the evaporator.

The current may vary. I have found that for each square meter of heating surface, a current of 4 amperes at a voltage of from 3–5 volts suffices, in view of the high conductivity of the liquor. The amperage required will vary with the area of the heating surface. The same voltage (3–5 v.) suffices for any usual surface area—say from 50 to 100 square meters.

As a further protection to the walls of the storage tanks, pumps, piping and evaporator, I have found it of advantage to add zinc chloride ($ZnCl_2$) to the liquor, after the free ammonia has been driven off. This is possible when the process is carried out continuously and the neutralized liquor is delivered to the tank 15. If zinc chloride be placed in the tank 15 in the proportion of approximately 1 kilogram of $ZnCl_2$ to each 100 liters of capacity of tank 15, injurious action of the liquor on the walls of the tank, etc., is materially reduced. This should be renewed at intervals of every two or three weeks.

The efficient protection of the equipment which is afforded by my invention is of the greatest importance to the commercial utility of the process, and constitutes an essential feature in the practice of my invention. With the understanding that my underlying thoughts may be utilized in other forms of apparatus, and that the process may be carried out in various ways, without departing from what I claim as my invention.

I claim—

1. In the treatment of waste ammonia liquor, the step of concentrating the same in the presence of a substance which prevents the formation of nitrogen chloride.

2. In the treatment of waste ammonia liquor, the step of concentrating the same and simultaneously passing an electric current therethrough from decomposing electrodes which prevent the formation of nitrogen chloride.

3. In the treatment of waste ammonia liquor, the step of concentrating the same in a ferrous vessel and simultaneously passing an electric current therethrough from a ferrous anode to the wall of the evaporator.

4. A process which comprises neutralizing a part at least of the alkalinity of ammoniacal liquor containing substantial quantities of common salt, concentrating such liquor by evaporation, while passing an electric current from a decomposable anode in said liquor to the shell of the evaporator, continuing until the boiling temperature of the liquor is between 110.5° and 113° C., and thereafter cooling the liquor to separate ammonium chloride therefrom.

5. A process which comprises neutralizing a part at least of the alkalinity of ammoniacal liquor containing substantial quantities of common salt, concentrating such liquor by evaporation, while passing an electric current from a decomposable anode in said liquor to the shell of the evaporator, continuing until the boiling temperature of the liquor is between 110.5 and 113° C., separating solidified sodium chloride from the liquor at about that temperature, and thereafter cooling the liquor to separate ammonium chloride therefrom.

6. A process which comprises neutralizing a part at least of the alkalinity of ammoniacal liquor, concentrating such liquor by evaporation while passing an electric current from an iron anode in said liquor to the shell of the evaporator, continuing until the boiling temperature of the liquor is between 110.5 and 113° C., and thereafter cooling the liquor to separate ammonium chloride therefrom.

7. A process which comprises neutralizing a part at least of the alkalinity of ammoniacal liquor, concentrating such liquor by evaporation while passing an electric current from a decomposable anode in said liquor to the shell of the evaporator, all while maintaining a zinc salt in solution in said liquor, continuing until the boiling temperature of the liquor is between 110.5 and 113° C., and thereafter cooling the liquor to separate ammonium chloride therefrom.

8. The treatment of waste ammonia liquor which comprises neutralizing the same by heating to a temperature below 100° C., for a sufficient period to drive off free ammonia and compounds containing the same, raising the temperature of the thus neutralized liquor to a point above 100° C. to concentrate the same, passing electric current through the liquor during concentration to prevent injury to the wall of the evaporator, and chilling the concentrated liquor to separate ammonium chloride therefrom.

In testimony whereof I have signed my name to this specification.

WILLIAM H. DAHMEN.